US 8,737,917 B2

(12) United States Patent
Desai et al.

(10) Patent No.: US 8,737,917 B2
(45) Date of Patent: May 27, 2014

(54) METHOD AND SYSTEM FOR A DUAL-MODE BLUETOOTH LOW ENERGY DEVICE

(75) Inventors: Prasanna Desai, Elfin Forest, CA (US); Chikan Kwan, San Diego, CA (US); Angel Polo, San Diego, CA (US); Song Qiao, San Diego, CA (US); Cindy Tian, San Diego, CA (US); Yuan Zhuang, San Diego, CA (US); Guoxin Xie, San Diego, CA (US); Latha Caliaperoumal, San Diego, CA (US); Brima Ibrahim, Aliso Viejo, CA (US)

(73) Assignee: Broadcom Corporation, Irvine, CA (US)

( * ) Notice: Subject to any disclaimer, the term of this patent is extended or adjusted under 35 U.S.C. 154(b) by 647 days.

(21) Appl. No.: 12/546,621

(22) Filed: Aug. 24, 2009

(65) Prior Publication Data

US 2011/0021142 A1    Jan. 27, 2011

Related U.S. Application Data

(60) Provisional application No. 61/228,361, filed on Jul. 24, 2009.

(51) Int. Cl.
*H04B 7/00* (2006.01)

(52) U.S. Cl.
USPC .................. 455/41.2; 455/63.1; 455/67.11

(58) Field of Classification Search
CPC .......................... H04W 52/0216; H04W 84/18
USPC ...................................................... 455/41.2
See application file for complete search history.

(56) References Cited

U.S. PATENT DOCUMENTS

| 2004/0048577 | A1* | 3/2004 | Godfrey et al. | 455/67.11 |
| 2004/0266494 | A1* | 12/2004 | Ruuska et al. | 455/574 |
| 2005/0020322 | A1* | 1/2005 | Ruuska et al. | 455/574 |
| 2008/0200120 | A1* | 8/2008 | Ruuska et al. | 455/41.2 |
| 2009/0176454 | A1* | 7/2009 | Chen et al. | 455/63.1 |
| 2009/0323720 | A1* | 12/2009 | Salokannel et al. | 370/468 |
| 2010/0091818 | A1* | 4/2010 | Sen et al. | 375/136 |
| 2010/0120362 | A1* | 5/2010 | Walley et al. | 455/41.2 |

OTHER PUBLICATIONS

The Bluetooth Specification Version 3.0 + HS Apr. 21, 2009 by SIG.*

* cited by examiner

*Primary Examiner* — David Bilodeau
(74) *Attorney, Agent, or Firm* — McDermott Will & Emery LLP

(57) ABSTRACT

A dual-mode BLE device identifies idle intervals within Bluetooth BR/EDR traffic communications. The identified idle intervals are used by the dual-mode BLE device to concurrently perform various BLE activities. For example, advertising packet transmissions, advertising packet scanning, connection setup, and/or data packet communication may be concurrently performed within identified idle intervals within the Bluetooth BR/EDR traffic communications. Packet transmission timing, advertising interval, scan window, and/or packet size are determined based on the identified idle intervals within the Bluetooth BR/EDR traffic communications. A scan window is adjusted based on timing of expected advertising transmissions and/or advertising interval(s) for saving power. BLE packets and Bluetooth BR/EDR packets may be detected in a single advertising channel. Maximal payload size is set based on the identified idle intervals within Bluetooth BR/EDR traffic communications. As a slave, the dual-mode BLE device updates connection parameters based on the identified idle intervals within Bluetooth BR/EDR traffic communications.

21 Claims, 13 Drawing Sheets

METHOD AND SYSTEM FOR A DUAL-MODE BLUETOOTH LOW ENERGY DEVICE

CROSS-REFERENCE TO RELATED APPLICATIONS/INCORPORATION BY REFERENCE

This patent application makes reference to, claims priority to and claims benefit from U.S. Provisional Patent Application Ser. No. 61/228,361 filed on Jul. 24, 2009.

The above stated application is hereby incorporated herein by reference in its entirety.

FIELD OF THE INVENTION

Certain embodiments of the invention relate to signal processing for communication systems. More specifically, certain embodiments of the invention relate to a method and system for a dual-mode Bluetooth low energy device.

BACKGROUND OF THE INVENTION

The Bluetooth low energy (BLE) is a specification that enables radio frequency communication operating within the globally accepted 2.4 GHz Industrial, Scientific & Medical (ISM) band. The BLE specification supports a physical layer bit rate of 1 Mbit/s over a range of 5 to 15 meters. The BLE wireless technology specification features two implementations, namely "dual-mode" and "single-mode". In the dual-mode implementation, BLE functionality is an add-on feature within traditional Bluetooth, namely, Bluetooth Basic Rate (BR) and Bluetooth Enhanced Data Rate (EDR), sharing a great deal of existing functionality resulting in a minimal cost increase compared to existing Bluetooth BR/EDR enabled devices. The dual-mode implementation is targeted at mobile devices and personal computers. The single-mode implementation is power and cost optimized. The single-mode implementation features a lightweight Link Layer (LL) providing ultra-low power idle mode operation, simple device discovery and reliable point-to-multipoint data transfer with advanced power-save and encryption functionalities. The single-mode implementation is targeted at, for example, small, button-cell battery powered devices in, for example, sports and wellness, healthcare, entertainment and toys and mobile accessories product categories.

The BLE offers connectivity between mobile devices or personal computers, and small button-cell battery power devices.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for a dual-mode Bluetooth low energy device, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for a dual-mode Bluetooth low energy device. In accordance with various exemplary embodiments of the invention, a dual-mode BLE device may be enabled to identify idle intervals within Bluetooth BR/EDR traffic communications. The dual-mode BLE device may be operable to concurrently perform various BLE activities within the identified idle intervals within Bluetooth BR/EDR traffic communications. In advertising channels, the dual-mode BLE device may operate as an advertiser, a scanner, or an initiator. As an advertiser, the dual-mode BLE device may be enabled to schedule advertising packet transmissions in the determined idle intervals within the Bluetooth BR/EDR traffic communications. The dual-mode BLE device may be enabled to determine advertising intervals to concurrently perform advertising packet transmissions in the identified idle intervals within the Bluetooth BR/EDR traffic communications.

Packet transmission timing and packet size of the advertising packet transmissions may be determined based on the identified idle intervals within the Bluetooth BR/EDR traffic communications. As a scanner, the dual-mode BLE device may be operable to detect BLE advertising packets and Bluetooth BR/EDR packets in an advertising channel for a fast link connection setup. The dual-mode BLE device may be operable to concurrently perform a scanning procedure within the identified idle intervals of the Bluetooth BR/EDR traffic communications. A scan window may be determined based on the identified idle intervals within the Bluetooth BR/EDR traffic communications. The determined scan window may be adjusted based on timing of expected advertising transmissions and/or advertising interval(s) for low power consumption. In data channels, the dual-mode BLE device may be configured to schedule BLE data packets in the identified idle intervals within the Bluetooth BR/EDR traffic communications. As a master, the dual-mode BLE device may be enabled to set maximal payload size based on the identified idle intervals within the Bluetooth BR/EDR traffic communications. As a slave, the dual-mode BLE device may be enabled to update associated connection parameters based on the identified idle intervals within the Bluetooth BR/EDR traffic communications.

Figure 1:
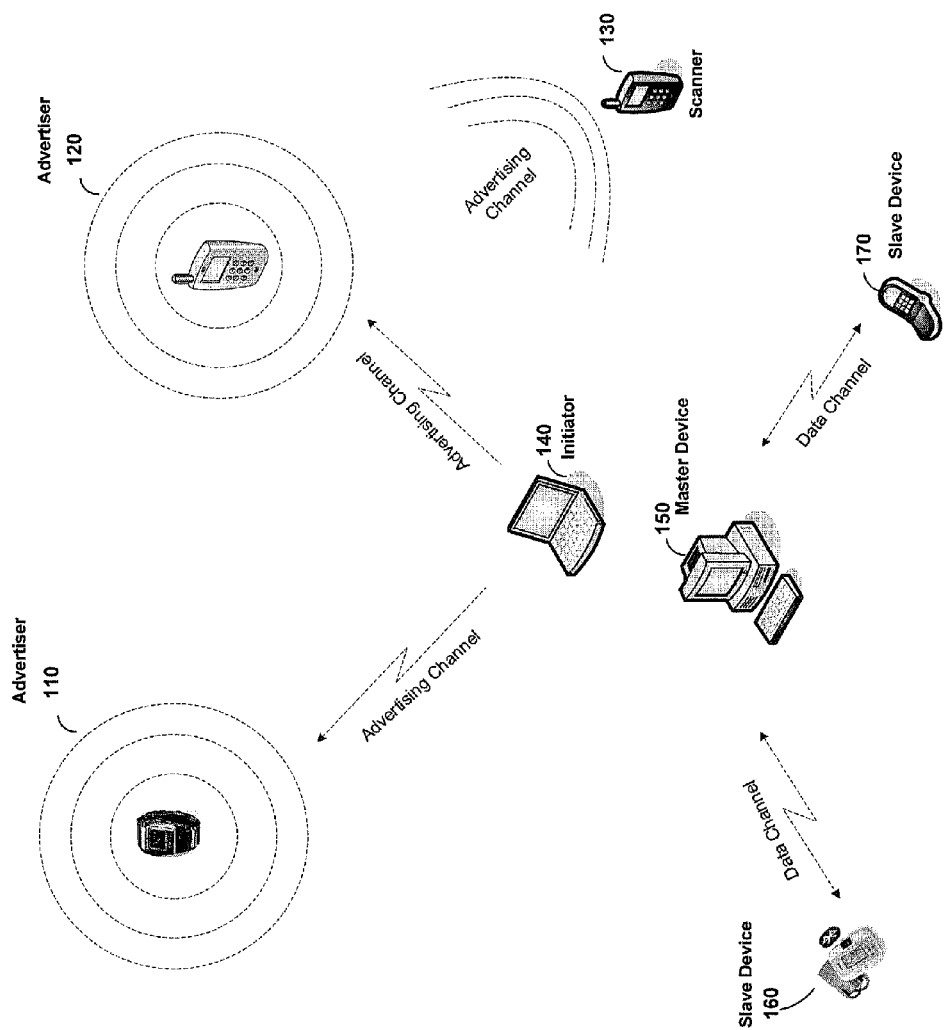
FIG. 1 is a diagram illustrating an exemplary Bluetooth Low Energy (BLE) communication system that is operable to support BLE activities and Bluetooth BR/EDR traffic simultaneously, in accordance with an embodiment of the invention.

FIG. 1 is a diagram illustrating an exemplary Bluetooth Low Energy (BLE) communication system that is operable to support BLE activities and Bluetooth BR/EDR traffic communications simultaneously, in accordance with an embodiment of the invention. Referring to FIG. 1, there is shown a Bluetooth low energy (BLE) communication system 100 comprising a plurality of BLE devices, of which advertisers 110-120, a scanner 130, an initiator 140, a master device 150, and slave devices 160-170 are displayed.

The BLE communication system 100 may be operable to utilize a frequency division multiple access (FDMA) scheme and a time division multiple access (TDMA) scheme to support voice and/or data communication. The communication system 100 may be configured to divide a plurality of physical channels, for example, 40 physical channels, into advertising channels and data channels per FDMA scheme. In advertising channels, a BLE device may function in a role as an advertiser, a scanner, or an initiator. In data channels, a BLE device may play a role as a master or a slave. The communication system 100 may be enabled to utilize a TDMA based polling scheme in link layer communications between the master device 150 and the slave devices 160-170.

An advertiser such as the advertiser 120 may comprise suitable logic, circuitry and/or code that may be enabled to broadcast advertisements periodically in advertising channels. The advertiser 120 may be configured to advertise service and/or availability for a link layer connection. The advertiser 120 may be enabled to transmit advertising packets within advertising events. An advertising event may begin with the presence of an advertising packet sent by the advertiser 120.

The advertiser 120 may be operable to determine whether or not a received request to be processed according to a white list. The white list comprises a list of, for example, 48 bit Bluetooth low energy device addresses of preferred BLE devices. When using the white list for device filtering, the advertiser 120 may be configured to process requests from those BLE devices in the white list. In this regard, the advertiser 120 may be enabled to facilitate smart device filtering using a white list comprising device class bits of preferred BLE devices. The advertiser 120 may be configured to use the white list for device filtering based on device class bits other than 48-bit Bluetooth low energy device addresses. The advertiser 120 may become a slave once an associated link layer connection has been set up.

The scanner 130 may comprise suitable logic, circuitry and/or code that may be operable to search for advertising BLE devices within range. The scanner 130 may be configured to perform a passive scan or an active scan. In a passive scan, the scanner 130 may be enabled to listen for advertising packets and may not transmit messages to advertisers. In an active scan, the scanner 130 may request an advertiser to transmit additional information that may not be available in the received advertising packets. The scanner 130 may be operable to select a scan interval and a scan window for a scanning process. In an exemplary embodiment of the invention, the scan interval and the scan window may be specified as an integer multiple of 0.625 ms in the range of 2.5 ms to 10.24 s. If the scan interval and the scan window are set to be the same value, the scanning process may be run in advertising channels continuously. The scanner 130 may be operable to scan different advertising channels between two consecutive scan windows. The scanner 130 may be enabled to stay on one advertising channel for one scan window.

The scanner 130 may be operable to discover information about available advertisers in a local area. The scanner 130 may be configured to use a white list for device filtering. The scanner 130 may be enabled to process advertising packets from advertisers in the white list. The white list may comprise a list formed by device class bits of preferred BLE devices. The scanner 130 may be enabled to use the white list for device filtering based on device class bits other than 48-bit Bluetooth low energy device addresses.

The scanner 130 may be operable to set control scan windows in order to reduce power consumption. For example, the scanner 130 may be operable to turn on a scan window at time for expected advertising packet transmissions. In this regard, the scanner 130 may be enabled to evaluate cadence of the advertising packet transmissions to determine timing of expected advertising packet transmissions. The scanner 130 may be operable to reduce the scan window size for the expected advertising packet transmissions. The scanner 130 may be enabled to close the scan window for unexpected advertising packet transmissions to save power. Alternatively, the scanner 130 may be enabled to perform conditional scanning for expected advertising packet transmission. The scanner 130 may be configured to scan selectively on the advertising channels used by intended advertisers such as the advertiser 120. The scanner 130 may be enabled to estimate advertising intervals utilized by the advertiser 120. The scanner 130 may be enabled to narrow or reduce the scan window size for the scanning process. The use of reduced scan window size may lead to lower power consumption on the scanner 130.

For coexistence with Bluetooth communication, the scanner 130 may be configured to scan advertising packets in between idle intervals within the Bluetooth BR/EDR traffic communications. The scanning timing may be decoupled from the Bluetooth timing. Accordingly, within each of the Bluetooth BR/EDR traffic idle intervals, the scanner 130 may be enabled to perform instant scanning. The scanner 130 may have a dual-correlation capability such that BLE advertising packets and other packets such as the BR/EDR packets may be detected in an advertising channel. In this regard, the scanner 130 may be operable to tune to a single advertising channel to scan packets transmitted over the single advertising channel. The BLE advertising packets and/or the BR/EDR packets may be detected by correlating the scanned packets with, for example, known sequence rate. The dual-correlation capability of the scanner 130 may speed up the link reconnection time by scanning, for example, 3 advertising frequencies instead of 32 frequencies.

The initiator 140 may comprise suitable logic, circuitry and/or code that may be operable to request establishment of a link layer connection with an intended advertiser for received advertising packets. Upon receipt of advertising packets from advertisers, the initiator 140 may be enabled to determine specific advertisers to which a Connect_REQ packet may be transmitted. The initiator 140 may be configured to process advertising packets from advertisers in the white list. In this regard, the white list may comprise a list recorded with device class bits for preferred BLE devices. The initiator 140 may be configured to use the white list for device filtering based on the device class bits other than 48-bit Bluetooth low energy device addresses.

Upon receipt of advertising packets from an intended advertiser such as the advertiser 120, the initiator 140 may be operable to send a connection request (Connect_REQ) packet in the advertising channel, in which the intended advertiser such as the advertiser 120 is advertising. The Connect_REQ packet may comprise connection parameters such as hopping frequency length used for calculating a data channel for setting up a link layer connection with the advertiser 120.

The master device 150 may comprise suitable logic, circuitry and/or code that may be enabled to communicate with slaves such as the slave devices 160-170. The master device 150 may be capable of supporting multiple link layer connections at a time to various slaves, for example, the slave devices 160-170. The master device 150 may be operable to manage various aspects of data packet communication in a link layer connection with an associated slave such as the slave device 170. For example, the master device 150 may be enabled to determine operation schedule in the link layer connection with the slave device 170. The master device 150 may be enabled to initiate a packet exchange sequence in the link layer connection with its own transmission. Link layer connections may comprise periodic connection events in data channels. Data packet transmissions may take place within connection events.

In an exemplary embodiment of the invention, during a connection event, data packets may be transmitted with 150 μs spacing and at least one data packet is from the master device 150 in the connection event. The master device 150 may be configured to transmit the first data packet in each connection event to an intended slave such as the slave device 170. Transmission of the first data packet in each connection event may vary from 1.25 ms to 4.85 ms. The master device 150 may be operable to utilize a TDMA based polling scheme to poll the intended slave for packet transmission in each connection event. The master device 150 may be enabled to determine packet payload size for data packets and packet transmission timing in each connection event. In this regard, in a coexistence scenario with Bluetooth connections, the master device 150 may be enabled to support Bluetooth BR/EDR traffic communications such as HV3 or A2DP as well as concurrent BLE activity simultaneously. In this regard, the master device 150 may be enabled to dynamically set or adjust packet payload size for associated BLE link layer connections based on the available idle intervals in between Bluetooth BR/EDR traffic communications to achieve a higher throughput.

A slave device such as the slave device 170 may comprise suitable logic, circuitry and/or code that may be enabled to communicate with a master such as the master device 150 in an associated BLE link layer connection. The slave device 170 may be associated with one link layer connection with the master device 150. The slave device 170 may be enabled to synchronize to connection event start points, called anchor points from a slave's perspective, for data communication with the master device 150. The slave device 170 may consider that a link layer connection setup with the master device 150 may be complete after receiving a connection request (CONNECT_REQ) packet from the master device 150. The slave device 170 may be enabled to calculate a data channel index using a channel selection algorithm for each connection event in the associated link layer connection. The data channel index may be determined based on, for example, a hopping frequency length (Hop_length) in the received CONNECT_REQ packet. The slave device 170 may be enabled to move to a data channel with the calculated data channel index to communicate data packets with the master device 150. The slave device 170 may be operable to transmit data packets in the data channel after receiving a packet from the master device 150 in associated link layer connection.

After the associated link layer connection has been established, the slave device 170 may be operable to receive a connection update request packet from the master device 150 for updating the associated link layer connection parameters such as connection event anchor points. The slave device 170 may be enabled to, for example, synchronize to updated anchor points to continue data communication with the master device 150 in the associated link layer connection. In this regard, in a coexistence scenario with Bluetooth connections, the slave device 170 may be enabled to support Bluetooth BR/EDR traffic communications as well as concurrent BLE activities. The slave device 170 may be enabled to transmit a connection update request packet to the master device 150 for updating the associated link layer connection parameters such as anchor points. The slave device 170 may be enabled to adjust BLE timing in a manner which avoids collisions with concurrent Bluetooth BR/EDR traffic communications.

In an exemplary operation, the advertiser 120 may be enabled to transmit advertising packets in advertising channels to BLE devices such as, for example, the scanner 130 and/or the initiator 140. The scanner 130 may be enabled to scan advertising packets from the advertiser 120 to discover devices within range, for example. The scanner 130 may be enabled to use the white list for device filtering. The scanner 130 may be enabled to process advertising packets from advertisers in the white list. The white list may be formed by device class bits. When coexisting with Bluetooth BR/EDR traffic communications, the scanner 130 may be enabled to identify idle intervals within the Bluetooth BR/EDR traffic communications such that the scanner 130 may be enabled to perform scan activities within the identified Bluetooth BR/EDR traffic idle intervals. The scanner 130 may be enabled to adjust scanning parameters such as the scan window size and scanning timing based on the identified Bluetooth BR/EDR traffic idle intervals. In addition, the scanner 130 may be enabled to turn on or off the scan window for low power consumption. When advertising for a link layer connection, the advertiser 120 may be enabled to listen to CONNECT_REQ packets from, for example, the initiator 140. When a white list is used for device filtering, the initiator 140 may be configured to send CONNECT_REQ packets to advertisers in the white list. The white list may be formed by device class bits. Upon receiving a CONNECT_REQ packet addressed to the advertiser 120 from the initiator 140, the advertiser 120 may be enabled to move to a data channel and operate as a slave. When coexisting with Bluetooth BR/EDR traffic communications, a slave such as the slave device 170 may be enabled to support both Bluetooth BR/EDR traffic and BLE activities simultaneously. The slave device 170 may be operable to support BLE activities and concurrent Bluetooth BR/EDR traffic communications by updating connection parameters such as connection anchor points in associated link layer connection. The slave device 170 may be enabled to determine expected or desired connection parameters and transmit a connection request packet to the master device 150 for a connection update. Upon being acknowledged by the master device 150, the slave device 170 may be enabled to continue BLE packet transmission using the updated connection parameters.

Figure 2:
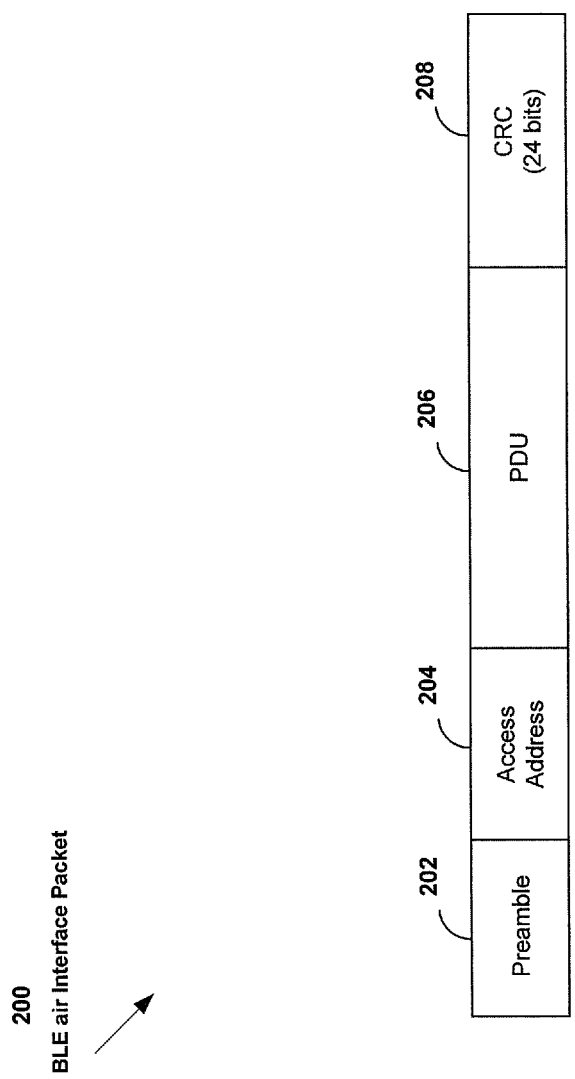
FIG. 2 is a diagram illustrating an exemplary BLE air interface packet structure, in accordance with an embodiment of the invention.

FIG. 2 is a diagram illustrating an exemplary Bluetooth Low Energy (BLE) air interface packet structure, in accordance with an embodiment of the invention. Referring to FIG. 2, there is shown a BLE packet 200 comprising a preamble 202, an access address 204, a Protocol Data Unit (PDU) 206, and a CRC 208.

The preamble 202 may comprise eight bit long sequence of either '10101010' or '01010101'. An advertising channel packet may use '01010101' as the preamble 202. The preamble 202 may comprise either '10101010' or '01010101' for a data channel packet. The preamble 202 may be used by a BLE receiver such as the initiator 140 to perform frequency synchronization, symbol timing estimation, and gain control training. In this regard, the BLE receiver such as the initiator 140 may be enabled to assign particular operating frequencies for a fast link layer connection setup in order to save power. The initiator 140 may be enabled to use the preamble 204 in the received advertising packets to perform frequency synchronization to the assigned particular operating frequencies to save power at the initiator 140.

The access address 204 may comprise a 32-bit value. The access address 204 may comprise a bit string of '01101011011111011001000101110001' for an advertising channel packet. The access address 204 in data channel packets may be unique for each link layer connection. The access address 204 in data channel packets may comprise a pseudo-random 32-bit value, generated by an intended initiator of corresponding link layer connection.

The PDU 206 may comprise actual data and/or control information such as, for example, a 48-bit device address, from higher layers. The PDU 206 may be in a variable size ranging from 2 to a maximum of 39 octets. The leftmost bit may be transmitted first. For packets in advertising channels such as advertising packets, initiator packets, and/or scanning packets, the PDU 206 may comprise device addresses such as advertiser address, initiator address, or scanner address, respectively. A device address is a unique 48-bit Bluetooth Low Energy device address comprising key bits for corresponding device class. When device filtering used, the receiver may be enabled to utilize device class bits of corresponding device address such as advertiser address, initiator address, or scanner address for device filtering.

The cyclic redundancy check (CRC) 208 may be appended to the PDU 206 with the BLE packet 200 to allow integrity verification. The CRC 208 may be calculated on the PDU 206. The CRC 208 may be utilized at a receiver to determine whether the PDU 206 may be in error. For example, upon the reception of the BLE packet 200, a local CRC may be calculated on the PDU 206 to be compared with the CRC 208 in the BLE packet 200. A mismatch between the local CRC and the CRC 208 may lead to a CRC error. Two consecutive packets received with CRC error within a connection event may cause a corresponding connection closed event.

In an exemplary operation, the BLE packet 200 may be for an advertising packet with the preamble 202 of '01010101' and the access address 204 of '01101011011111011001000101110001'. The BLE packet 200 may be transmitted periodically in advertising channels by an advertiser such as the adviser 120 for a service advertisement and/or a link layer connection. In instances where the adviser 120 may be enabled to transmit the BLE air interface packet 200 for a link layer connection with a specific initiator such as the initiator 140. The PDU 206 may comprise information such as, for example, a 48-bit advertiser's device address and a 48-bit initiator's device address. When device filtering used at the initiator 140, device class bits in the 48-bit advertiser's device address may be extracted for device filtering.

Figure 3:
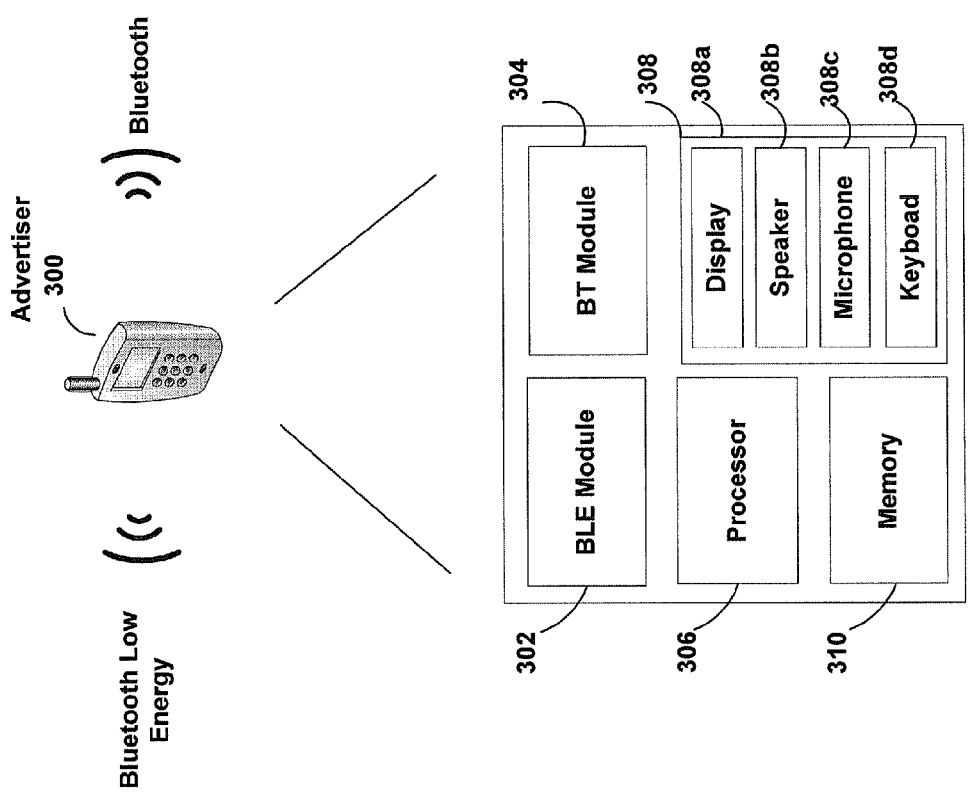
FIG. 3 is a diagram illustrating an exemplary dual-mode BLE advertiser that is operable to concurrently perform BLE advertising during Bluetooth BR/EDR traffic communications, in accordance with an embodiment of the invention.

FIG. 3 is a diagram illustrating an exemplary dual-mode BLE advertiser that is operable to concurrently perform BLE advertising during Bluetooth BR/EDR traffic communications, in accordance with an embodiment of the invention. Referring to FIG. 3, there is shown an advertiser 300 comprising a BLE module 302, a Bluetooth (BT) module 304, a processor 306, a user interface 308, and a memory 310. The user interface 308 may comprise a display 308a, a speaker 308b, a microphone 308c, and a keyboard 308d.

The BLE module 302 may comprise suitable logic, circuitry, interfaces and/or code that may be enabled to transmit and/or receive signals over Bluetooth low energy air interface and communicate with the processor 306 for further processing.

The BT module 304 may comprise suitable logic, circuitry, interfaces and/or code that may be enabled to transmit and/or receive signals over, for example, Bluetooth air interfaces. The BT module 304 may be enabled to communicate the signals with the processor 306 for further processing.

The processor 306 may comprise suitable logic, circuitry, interfaces and/or code that may be enabled to perform a variety of signal processing tasks associated with the BLE module 302 and/or the BT module 304. The processor 306 may comprise controlling of the BLE module 302 as well as the BT module 304. In this regard, the processor 306 may be enabled to support BLE advertising activities and Bluetooth BR/EDR traffic communications simultaneously. The processor 306 may be enabled to identify idle intervals in between Bluetooth BR/EDR traffic communications over the BT module 304. The identified Bluetooth BR/EDR traffic idle intervals may comprise idle intervals in between Bluetooth packets, Bluetooth slots, and/or Bluetooth frames. The processor 306 may be enabled to perform BLE advertising activities within the identified idle intervals. The processor 306 may be operable to vary the size of advertising packets for service advertisement within the identified idle intervals. For example, in instances when advertising for a link layer connection setup, the processor 306 may be enabled to vary the size of advertising packets to ensure that a link layer connection procedure may be completed prior to occurrence of the next Bluetooth activity.

The user interface 308 may comprise suitable logic, circuitry, interfaces and/or code that may be enabled to service the advertiser 300 via entering user inputs and/or presenting various services to users. The user interface 308 may comprise a plurality of associated components such as the display 308a, the speaker 308b, the microphone 308c, and the keyboard 308d. The display 308a may enable presentation or display graphics and/or text to users. Services implemented via the BLE module 302 and/or the BT module 304 may be presented to users as image data on the display 308a and/or as voice via the speaker 308b, for example, by pressing the keyboard 308d and/or generating an audio indication through the microphone 308c.

The memory 310 may comprise suitable logic, circuitry, interfaces and/or code that may enable storage of data and/or other information utilized by the processor 306. For example, the memory 308 may be utilized to store communication data on the BLE module 302 and/or the BT module 304. The memory 310 may be enabled to store executable instructions for starting or stopping BLE advertising during Bluetooth BR/EDR traffic. The memory 310 may be enabled to store algorithms to, for example, calculate the size of advertising packets based on identified Bluetooth BR/EDR traffic idle intervals. The memory 310 may comprise RAM, ROM, low latency nonvolatile memory such as flash memory and/or other suitable electronic data storage capable of storing data and instructions.

In an exemplary operation, the processor 306 may be enabled to support the BLE advertising activities and the Bluetooth BR/EDR traffic communications simultaneously. The processor 306 may be enabled to identify idle intervals within Bluetooth BR/EDR traffic communications over the BT module 304. The processor 306 may be enabled to perform BLE advertising activities via the BLE module within the identified Bluetooth BR/EDR traffic idle intervals. The processor 306 may be configured to adaptively setting the size of advertising packets for service advertisement based on the identified Bluetooth BR/EDR traffic idle intervals. When advertising for a link layer connection, the processor 306 may be configured to select the size of advertising packets to ensure that a link layer connection setup may be completed prior to occurrence of the next Bluetooth activity.

Figure 4:
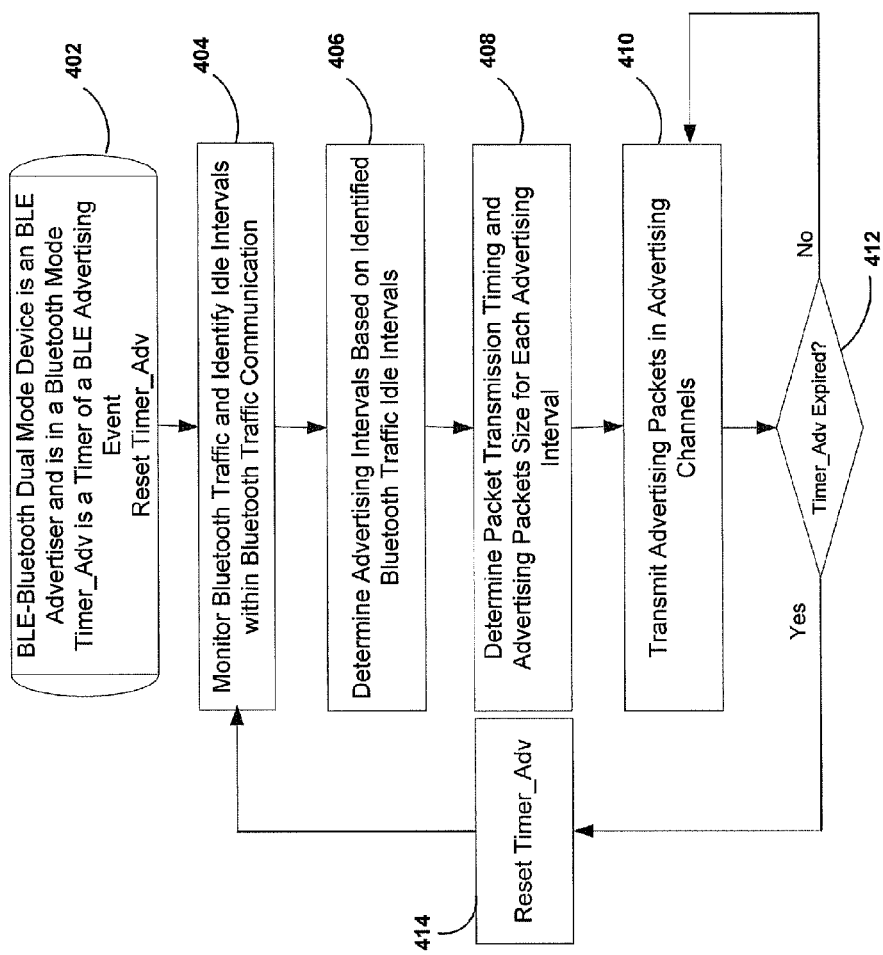
FIG. 4 is a diagram illustrating exemplary steps for supporting BLE advertising and Bluetooth BR/EDR traffic communications simultaneously in a dual-mode BLE advertiser, in accordance with an embodiment of the invention.

FIG. 4 is a diagram illustrating exemplary steps for supporting the BLE advertising and Bluetooth BR/EDR traffic communications simultaneously in a dual-mode BLE advertiser, in accordance with an embodiment of the invention. Referring to FIG. 4, the exemplary steps start with step 402, where a dual-mode BLE device such as the advertiser 120 is in a Bluetooth mode. Parameter Timer_Adv is a timer for a BLE advertising event. The advertising event timer, Timer_Adv, may be utilized to provide a reset to the processor 306 in case when time of an advertising event expires. In step 404, the processor 306 may be enabled to monitor the Bluetooth BR/EDR traffic communications over the BT module 304 to identify idle intervals of the Bluetooth BR/EDR traffic. In step 406, the processor 306 may be enabled to determine advertising intervals based on the identified Bluetooth BR/EDR traffic idle intervals for BLE advertising activities. In step 408, the processor 306 may be enabled to determine packet transmission timings and advertising packet size based on the identified Bluetooth BR/EDR traffic idle intervals for each determined advertising intervals. In step 410, the processor 306 may be enabled to transmit advertising packets via the BLE module 302 in advertising channels. In step 412, it may be determined whether the advertising event timer Timer_Adv has expired. In instances where the advertising event timer Timer_Adv has expired, then in step 414, the advertising event timer Timer_Adv may be reset. The exemplary process may return to step 404.

In step 412, in instances where the advertising event timer Timer_Adv has not expired, then exemplary steps return to step 410 to continue transmitting advertising packets as needed.

Figure 5:
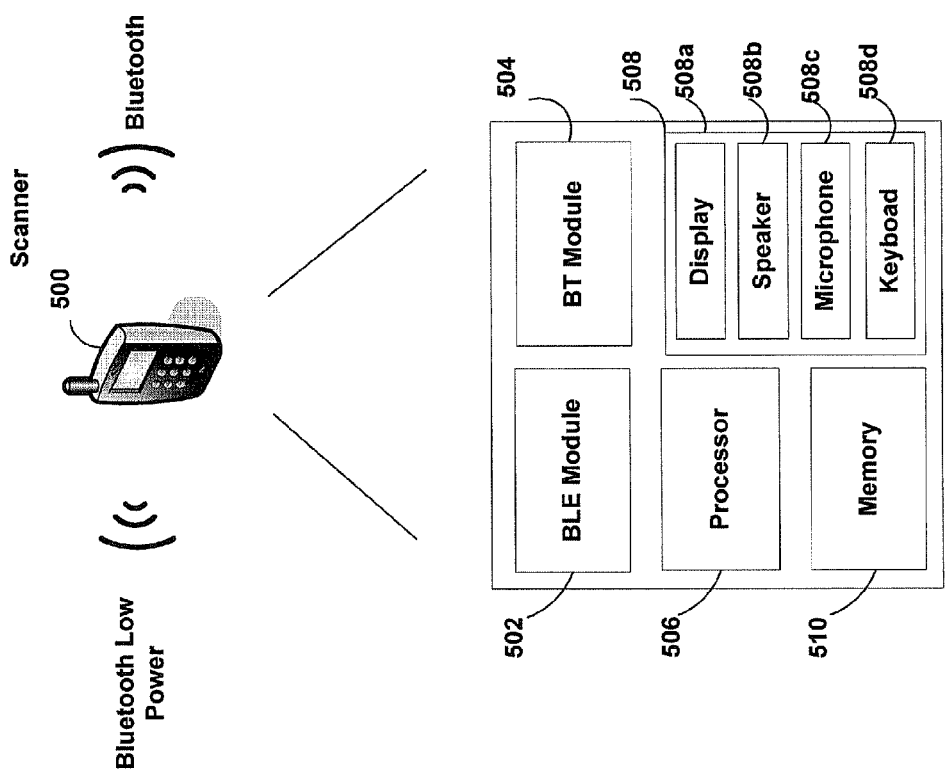
FIG. 5 is a diagram illustrating an exemplary dual-mode BLE scanner that is operable to concurrently perform BLE scanning during Bluetooth BR/EDR traffic communications, in accordance with an embodiment of the invention.

FIG. 5 is a diagram illustrating an exemplary dual-mode BLE scanner that is operable to concurrently perform BLE scanning during Bluetooth BR/EDR traffic communications, in accordance with an embodiment of the invention. Referring to FIG. 5, there is shown a scanner 300 comprising a BLE module 502, a Bluetooth (BT) module 504, a processor 506, a user interface 508, and a memory 510. The user interface 508 may comprise a display 508a, a speaker 508b, a microphone 508c, and a keyboard 508d.

The BLE module 502 may comprise suitable logic, circuitry, interfaces and/or code that may be enabled to transmit and/or receive signals over Bluetooth low energy air interface and communicate with the processor 506 for further processing.

The BT module 504 may comprise suitable logic, circuitry, interfaces and/or code that may be enabled to transmit and/or receive signals over, for example, Bluetooth air interfaces. The BT module 504 may be enabled to communicate the signals with the processor 506 for further processing.

The processor 506 may comprise suitable logic, circuitry, interfaces and/or code that may be operable to perform a variety of signal processing tasks associated with the BLE module 502 and/or the BT module 504. The processor 506 may comprise controlling of the BLE module 502 as well as the BT module 504. In this regard, the processor 506 may be enabled to support BLE scanning activities via the BLE module 502 and Bluetooth BR/EDR traffic communications via the BT module 304 simultaneously. The processor 506 may be operable to monitor the Bluetooth BR/EDR traffic communications over the BT module 504 and identify idle intervals in between the Bluetooth BR/EDR traffic. The identified idle intervals may comprise idle intervals in between Bluetooth packets, Bluetooth slots, and/or Bluetooth frames. The processor 506 may be operable to allocate a scan window within the identified Bluetooth BR/EDR traffic idle intervals to perform BLE scanning activities. The scan window size may be determined based on the identified Bluetooth BR/EDR traffic idle intervals. The processor 506 may be operable to decouple scanning timing with Bluetooth timing. Accordingly, the processor 506 may be operable to perform instant scanning within the identified idle intervals.

The processor 506 may be enabled to turn ON or OFF a scan window with respect to particular advertising packet transmissions in order to reduce power consumption in the scanner 500. The processor 506 may be enabled to evaluate cadence or periodicity of the advertising packet transmissions to identify timing of expected advertising packet transmission. The processor 506 may be configured to turn ON the scan window only for expected advertising packet transmission. The processor 506 may be enabled to adjust the size of the scan window to scan the expected advertising packet transmission at the identified timing. Alternatively, the processor 506 may be operable to estimate advertising intervals. The processor 506 may be enabled to narrow or reduce the scan window size for a scanning process based on estimated advertising intervals. To estimate an advertising interval, the process 506 may be enabled to, for example, selectively scan advertising channels such as even numbered advertising channels, utilized by, for example, the advertiser 120. The advertising interval may be estimated based on advertising activities on the selectively scanned advertising channels.

The user interface 508 may comprise suitable logic, circuitry, interfaces and/or code that may be enabled to service the scanner 500 via entering user inputs and/or presenting various services to users. The user interface 508 may comprise a plurality of associated components such as the display 508a, the speaker 508b, the microphone 508c, and the keyboard 508d. The display 508a may enable presentation or display graphics and/or text to users. Services implemented via the BLE module 502 and/or the BT module 504 may be presented to users as image data on the display 508a and/or as voice via the speaker 508b, for example, by pressing the keyboard 508d and/or generating an audio indication through the microphone 508c.

The memory 510 may comprise suitable logic, circuitry, interfaces and/or code that may enable storage of data and/or other information utilized by the processor 506. For example, the memory 508 may be utilized to store data communicated via the BLE module 502 and the BT module 504. The memory 508 may be enabled to store executable instructions for starting or stopping BLE scanning operations during Bluetooth BR/EDR traffic. The memory 508 may be enabled to store algorithms to, for example, calculate the size of scan window based on identified idle intervals of Bluetooth BR/EDR traffic. The memory 510 may comprise RAM, ROM, low latency nonvolatile memory such as flash memory and/or other suitable electronic data storage capable of storing data and instructions.

In operation, the scanner 500 may be operable to support BLE scanning activities and Bluetooth BR/EDR traffic communications simultaneously. The processor 506 may be enabled to monitor Bluetooth BR/EDR traffic communications activities on the BT module and identify idle intervals in between, for example, Bluetooth packets, Bluetooth slots, and/or Bluetooth frames of Bluetooth BR/EDR traffic. The processor 506 may be operable to allocate a scan window within the identified Bluetooth BR/EDR traffic idle intervals to perform BLE scanning activities via the BLE module 502. The processor 506 may be enabled to determine BLE scanning timing and the scan window size based on the identified Bluetooth BR/EDR traffic idle intervals. The processor 506 may be enabled to perform BLE scanning activities using a scanning timing decoupled with the Bluetooth timing within the identified Bluetooth idle intervals. The size of the scan window may be adjusted based on, for example, the identified Bluetooth BR/EDR traffic idle intervals, expected advertising packet transmission, and/or estimated advertising intervals for low power consumption.

Figure 6:
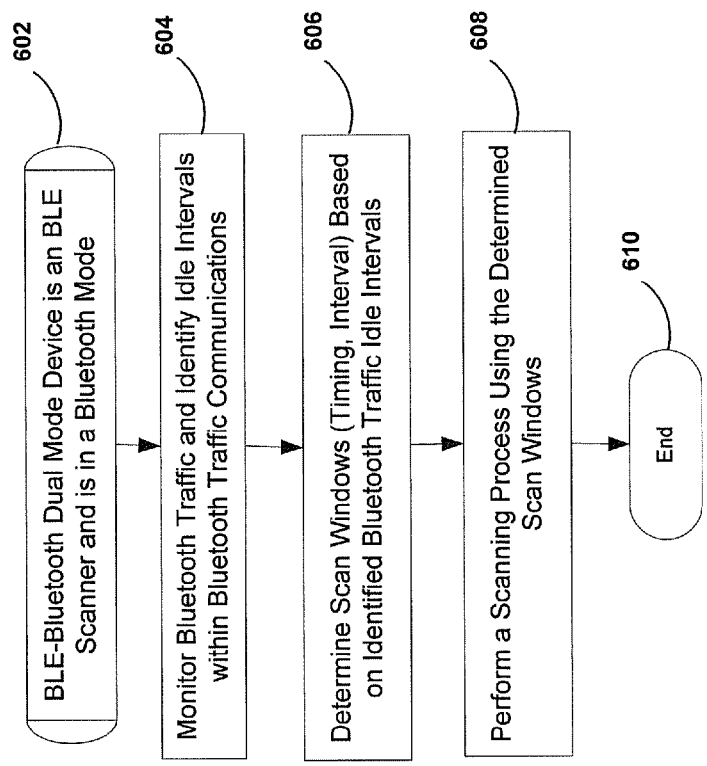
FIG. 6 is a diagram illustrating exemplary steps for supporting BLE scanning and Bluetooth BR/EDR traffic communications simultaneously in a dual-mode BLE scanner, in accordance with an embodiment of the invention.

FIG. 6 is a diagram illustrating exemplary steps for supporting BLE scanning and Bluetooth BR/EDR traffic communications simultaneously in a dual-mode BLE scanner, in accordance with an embodiment of the invention. Referring to FIG. 6, the exemplary steps start with step 602, where a dual-mode BLE device such as the scanner 130 is in a Bluetooth mode. In step 604, the processor 506 may be operable to monitor Bluetooth BR/EDR traffic communications over the BT module 504 to identify Bluetooth BR/EDR traffic idle intervals. The identified Bluetooth BR/EDR traffic idle intervals may comprise idle intervals in between Bluetooth packets, Bluetooth slots, and Bluetooth frames. In step 606, the processor 506 may be enabled to determine a scan window for performing scanning activities. Scan timing and the scan window size associated with the scan window may be determined based on the identified Bluetooth BR/EDR traffic idle intervals. In step 608, the processor 506 may be operable to perform a scanning process using the determined scan window. The exemplary process may be ended in step 610.

Figure 7:
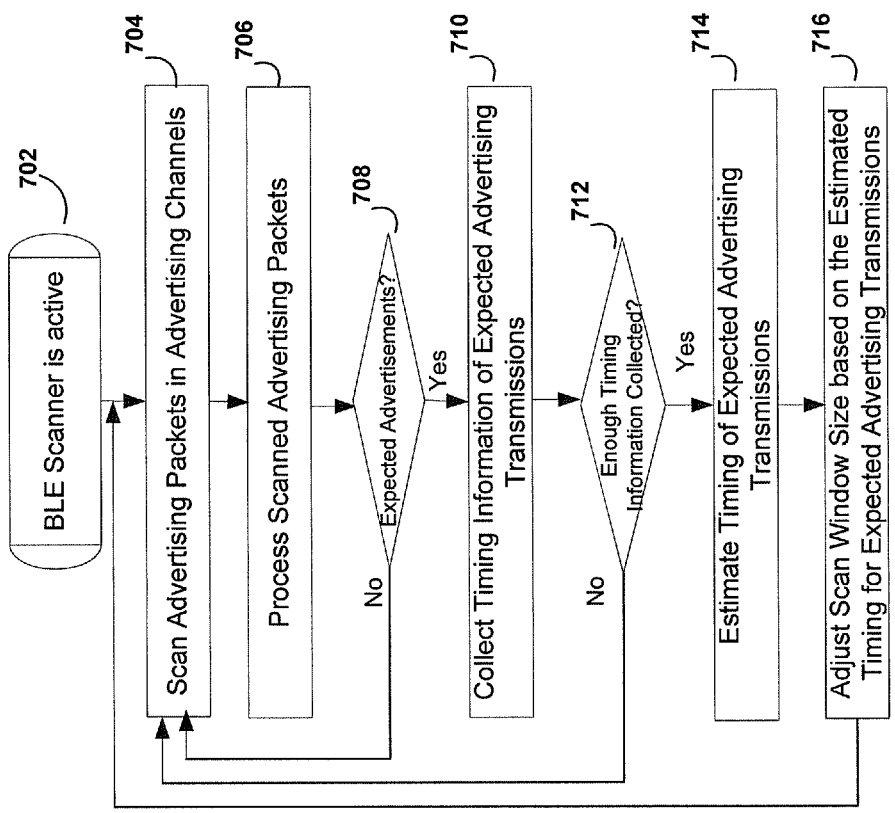
FIG. 7 is a flow chart illustrating exemplary steps for adapting scan window size to expected advertising packet transmissions, in accordance with an embodiment of the invention.

FIG. 7 is a flow chart illustrating exemplary steps for adapting scan window size to expected advertising packet transmissions, in accordance with an embodiment of the invention. Referring to FIG. 7, the exemplary steps start with step 702, where a BLE scanner such as the scanner 130 is active in a BLE scanning process. In step 704, the processor 506 may be enabled to scan advertising packets in advertising channels. In step 706, the processor 506 may be enabled to process the scanned advertising packets. In step 708, it may be determined if the scanned advertising packets may be expected advertising packet transmissions. In instances where the scanned advertising packets may be the expected advertising packet transmissions, then in step 710, where the processor 506 may be enabled to collect timing information of the expected advertising packet transmissions. In step 712, it may be determined whether enough timing information has been collected for estimating timing of the expected advertising packet transmissions. In instances where the collected timing information may be enough for estimating timing of the expected advertising packet transmissions, then in step 714, the processor 506 may be operable to estimate timing of the advertising packet transmissions using the collected timing information. In step 716, the processor 506 may be operable to adjust scan window size based on the estimated timing for scanning future expected advertising packet transmissions. The exemplary steps may return to step 704 to continue the scanning process with the adjusted scan window size.

In step 708, in instances where the scanned advertising packets may not be the expected advertising packet transmissions, then the exemplary steps may return to step 704 to continue the scanning process for expected advertising packet transmissions.

In step 712, in instances where the collected timing information may not be enough for estimating timing of the expected advertising packet transmissions, then the exemplary steps may return to step 704 to continue the scanning process for expected advertising packet transmissions.

Figure 8:
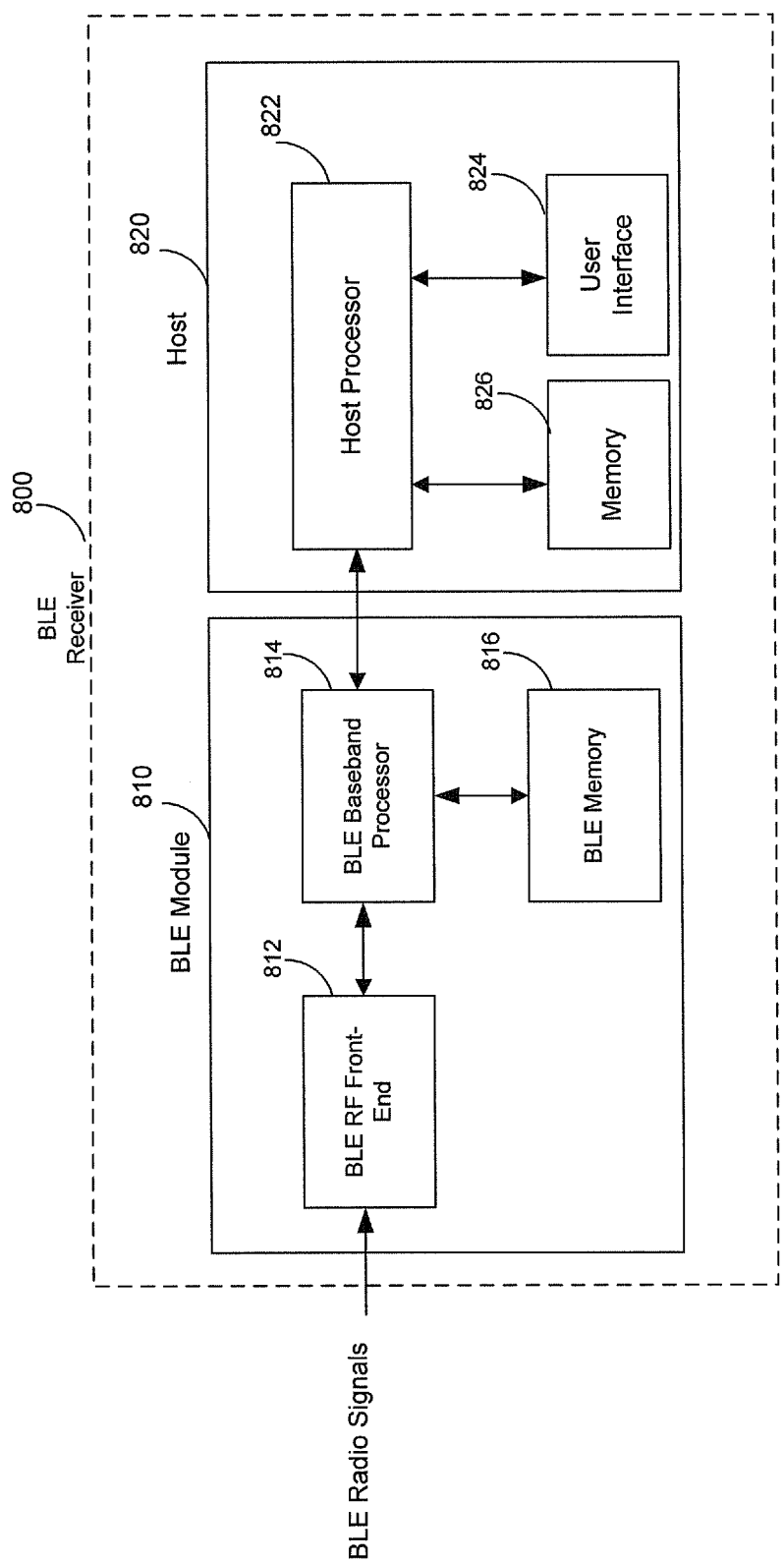
FIG. 8 is a diagram illustrating an exemplary BLE receiver that is operable to perform device filtering based on device class bits, in accordance with an embodiment of the invention.

FIG. 8 is a diagram illustrating an exemplary BLE receiver that is operable to perform device filtering based on device class bits, in accordance with an embodiment of the invention. Referring to FIG. 8, there is shown a BLE receiver 800 comprising a BLE module 810 and a host 820. The BLE module 810 comprises a BLE radio frequency (RF) front-end 812, a BLE baseband processor 814, and a BLE memory 816. The host 820 comprises a host processor 822, a user interface 824, and a memory 826.

The BLE module 810 may comprise suitable logic, circuitry, interfaces, and/or code that are operable to receive BLE signals. The BLE module 810 may be enabled to decode and process the received BLE signals.

The BLE RF front-end 812 may comprise suitable logic, circuitry and/or code that enable receiving of BLE signals and converting the received BLE signals into BLE baseband signals.

The BLE baseband processor 814 may comprise suitable logic, circuitry, interfaces, and/or code that are operable to process BLE baseband signals from the BLE RF front-end 812 to extract the information and data bits conveyed in the received signal. The BLE baseband processor 814 may be operable to perform functions such as frequency synchronization, symbol timing estimation, demodulation, and/or decoding. When advertising channel packets such as advertising packets may be received, the BLE baseband processor 814 may be enabled to facilitate smart device filtering using a white list stored in the BLE memory 816. The white list may comprise device class bits of preferred BLE devices. The BLE baseband processor 814 may be enabled to extract device class bits from the received advertising packets and compare with the white list. The BLE baseband processor 814 may be enabled to process the received advertising packets if the extract device bits may be found in the white list. The BLE baseband processor 814 may be operable to discard the received advertising packets if no entry in the white list may be found to match the extracted device class bits. In addition, the BLE baseband processor 814 may be configured to wake up the host processor 822 whenever receiving advertising packets from advertisers in the white list. The BLE baseband processor 814 may be configured so that it does not to wake up the host processor 822 upon the reception of advertising packets from advertisers not in the white list.

The BLE memory 816 may comprise suitable logic, circuitry, and/or code that may be operable to store information such as executable instructions and data that may be utilized by the BLE baseband processor 814. The executable instructions may comprise executable instructions for turning on or off the host processor 822 based on device filtering for processing advertising packets. The BLE memory 816 may be enabled to store the white list for device filtering. The BLE memory 816 may comprise RAM, ROM, low latency nonvolatile memory such as flash memory and/or other suitable electronic data storage.

The host processor 822 may comprise suitable logic, circuitry and/or code that may be enabled to process BLE baseband signals from the BLE baseband processor 814. The host processor 822 may be enabled to receive instructions from the BLE baseband processor 814 to start or stop processing advertising packets in received BLE baseband signals.

The user interface 824 may comprise suitable logic, circuitry, interfaces and/or code that may be enabled to service the BLE receiver 800 via entering user inputs and/or presenting various services to users.

The memory 826 may comprise suitable logic, circuitry, and/or code that may be operable to store information such as executable instructions and data that may be utilized by the host processor 822. The executable instructions may comprise algorithms that may be applied to process BLE packs for various applications. The memory 826 may comprise RAM, ROM, low latency nonvolatile memory such as flash memory and/or other suitable electronic data storage.

Although a single BLE receiver 800 is illustrated in FIG. 8, the invention may not be so limited. Accordingly, the BLE receiver 800 may be utilized for receiving BLE signals in radio frequency (RF) bands by a BLE initiator and/or a BLE scanner. The BLE initiator and/or the BLE scanner may be a single mode BLE device and/or a dual-mode BLE device.

In operation, the BLE receiver 800 may be operable to receive BLE signals via the BLE RF front-end 812. The BLE RF front-end 812 may be operable to process received BLE signals and convert them into BLE baseband signals. The received BLE signals may comprise advertising channel packets such as advertising packets. A white list comprising device class bits of preferred device class bits may be used for device filtering. The BLE baseband processor 814 may be enabled to extract device class bits from the received advertising packets and compare them with the white list in the BLE memory 816. If the extracted device bits may be found in the white list, the BLE baseband processor 814 may continue to process the received advertising packets, otherwise, the received advertising packets may be discarded. The BLE baseband processor 814 may be configured to wake up the host processor 822 whenever receiving advertising packets from advertisers in the white list. The host processor 822 may be enabled to process the received advertising packets using algorithms in the memory 826 for various applications.

Figure 9:
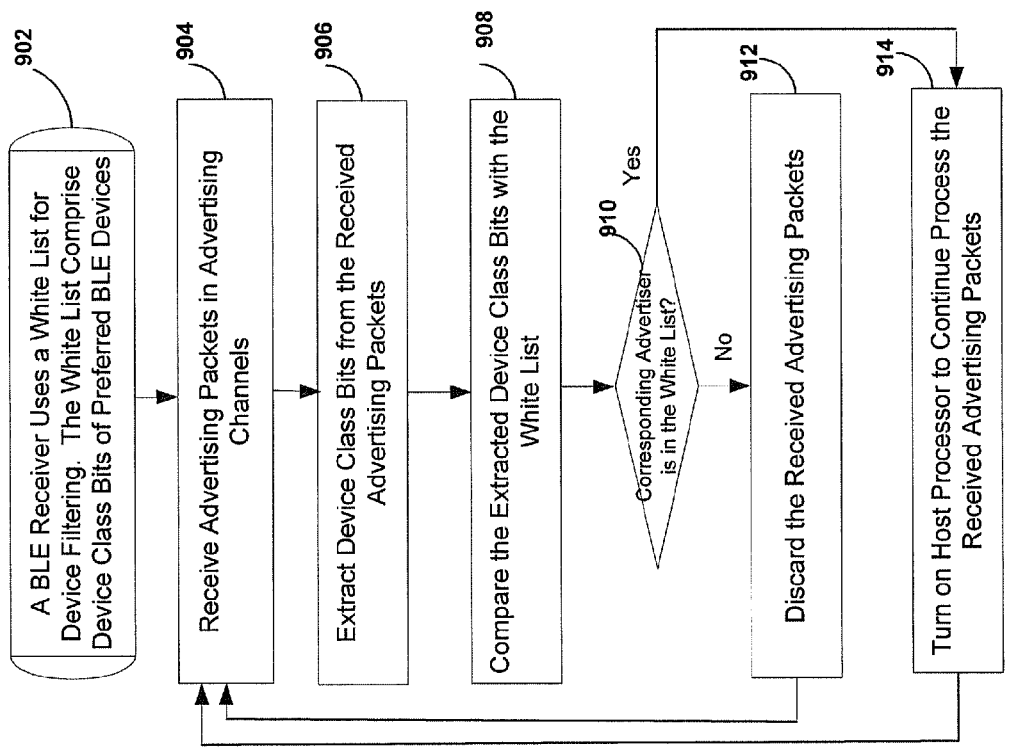
FIG. 9 is a flow chart illustrating exemplary steps for device filtering using device class bits, in accordance with an embodiment of the invention.

FIG. 9 is a flow chart illustrating exemplary steps for device filtering using device class bits, in accordance with an embodiment of the invention. Referring to FIG. 9, the exemplary steps start with step 902, where the BLE receiver 800 may be configured to use a white list for device filtering. In step 904, the BLE receiver 800 may be enabled to receive advertising packets in advertising channels. In step 906, the BLE receiver 800 may be enabled to extract device class bits from the received advertising packets. In step 908, the BLE receiver 800 may be enabled to compare the extracted device class bits with the white list for device filtering. In step 910, it may be determined whether the extracted device class bits are in the white list. In instances where the extracted device class bits may be in the white list, then in step 914, the BLE baseband processor 8914 may be configured to signal the host processor 822 to turn ON and process the received advertising packets. The exemplary steps may return to step 904.

In step 910, in instances where the extracted device class bits may not be in the white list, then in step 912, the BLE baseband processor 8914 may be operable to discard the received advertising packets. The exemplary steps may return to step 904.

Figure 10:
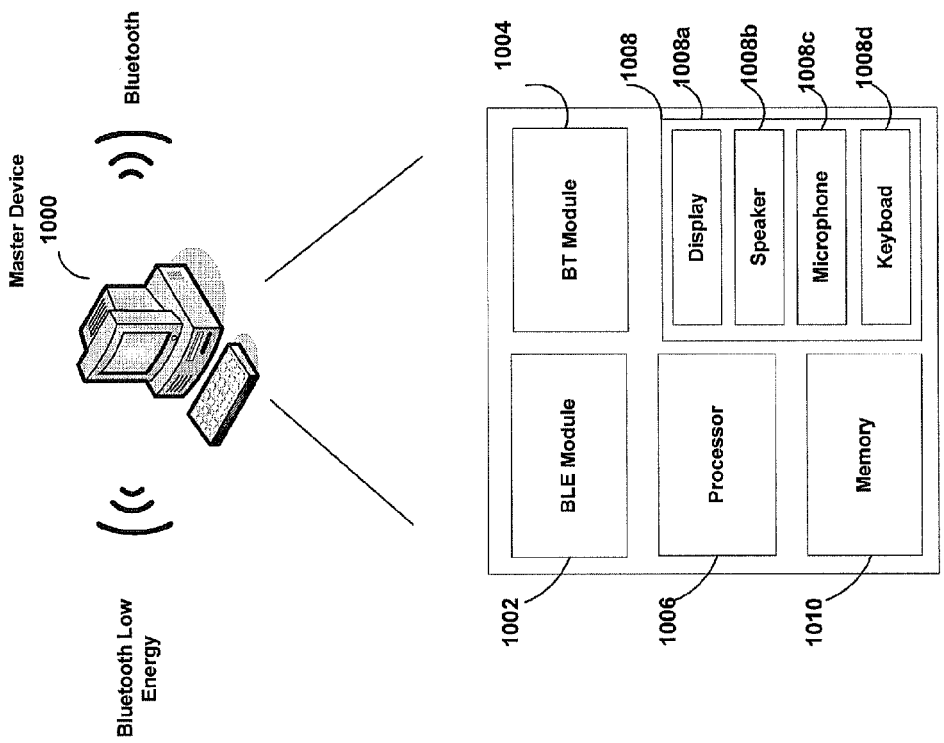
FIG. 10 is a diagram illustrating an exemplary dual-mode BLE master that is operable to support BLE activities and Bluetooth BR/EDR traffic simultaneously, in accordance with an embodiment of the invention.

FIG. 10 is a diagram illustrating an exemplary dual-mode BLE master that is operable to support BLE activities and Bluetooth BR/EDR traffic communications simultaneously, in accordance with an embodiment of the invention. Referring to FIG. 10, there is shown a dual-mode BLE master device 1000, hereafter called master device 1000. The master device 1000 comprises a BLE module 1002, a BT 1004, a processor 1006, a user interface 1008, and a memory 1010. The user interface 1008 may comprise a display 1008a, a speaker 1008b, a microphone 1008c, and a keyboard 1008d.

The BLE module 1002 may comprise suitable logic, circuitry, interfaces and/or code that may be operable to transmit and/or receive signals over Bluetooth low energy air interface and communicate with the processor 1006 for further processing.

The BT module 1004 may comprise suitable logic, circuitry, interfaces and/or code that may be enabled to transmit and/or receive signals over, for example, Bluetooth air interfaces. The BT module 1004 may be enabled to communicate the signals with the processor 1006 for further processing.

The processor 1006 may comprise suitable logic, circuitry, interfaces and/or code that may be enabled to perform a variety of signal processing tasks associated with the BLE module 1002 and/or the BT module 1004. The processor 1006 may comprise controlling of the BLE module 1002 as well as the BT module 1004. The processor 1006 may be enabled to support BLE traffic and Bluetooth BR/EDR traffic communications simultaneously. The processor 1006 may be operable to schedule BLE packet communication with intended slaves such as the slave devices 160-170 in associated link layer connections. The processor 1006 may be operable to manage BLE packet transmission in a way to avoid transmission interference from, for example, the Bluetooth BR/EDR traffic. In this regard, the processor 1006 may be operable to monitor Bluetooth activities over the BT module 1004 to identify idle intervals in between the Bluetooth BR/EDR traffic. The identified idle intervals may comprise idle intervals between Bluetooth packets, Bluetooth slots, and/or Bluetooth frames. The processor 1006 may be operable to schedule BLE data packet communication with intended slaves such as the slave device 170 within the identified Bluetooth BR/EDR traffic idle intervals. The processor 1006 may be operable to perform various BLE connection events in associated link layer connections within the identified Bluetooth BR/EDR traffic idle intervals during the Bluetooth BR/EDR traffic. The processor 1006 may be enabled to dynamically set or adjust BLE packet payload size within each connection event to fit the identified Bluetooth BR/EDR traffic idle intervals for a higher throughput.

The user interface 1008 may comprise suitable logic, circuitry, interfaces and/or code that may be enabled to service the master device 1000 via entering user inputs and/or presenting various services to users. The user interface 1008 may comprise a plurality of associated components such as the display 1008a, the speaker 1008b, the microphone 1008c, and the keyboard 1008d. The display 1008a may enable presentation or display of graphics and/or text to users. Services implemented via the BLE module 1002 and/or the BT module 1004 may be presented to users as image data on the display 1008a and/or as voice via the speaker 1008b, for example, by pressing the keyboard 1008d and/or generating an audio indication through the microphone 1008c.

The memory 1010 may comprise suitable logic, circuitry, interfaces and/or code that may enable storage of data and/or other information utilized by the processor 1006. For example, the memory 1008 may be utilized to store data communicated via the BLE module 1002 and the BT module 1004. The memory 1008 may be enabled to store executable instructions for starting or stopping BLE connection events during communication of the Bluetooth BR/EDR traffic. The memory 1008 may be enabled to store algorithms to, for example, calculate the size of BLE packet payload based on identified idle intervals of the Bluetooth BR/EDR traffic. The memory 1010 may comprise RAM, ROM, low latency non-volatile memory such as flash memory and/or other suitable electronic data storage capable of storing data and instructions.

In operation, the master device 1000 may be operable to support the BLE traffic and the Bluetooth BR/EDR traffic communications simultaneously. The processor 1006 may be enabled to schedule BLE activities in between the Bluetooth BR/EDR traffic communications on the BT module 1004. The processor 1106 may be enabled to monitor the Bluetooth BR/EDR traffic communication activities on the BT module 1004 and identify idle intervals in between, for example, Bluetooth packets, Bluetooth slots, and/or Bluetooth frames of the Bluetooth BR/EDR traffic. The identified Bluetooth BR/EDR traffic idle intervals may be utilized to communicate BLE traffic via the BLE module 1002. The processor 1006 may be enabled to determine BLE connection event intervals and connection event timing based on the identified Bluetooth BR/EDR traffic idle intervals. The processor 1006 may be enabled to schedule BLE traffic within the identified Bluetooth BR/EDR traffic idle intervals. The processor 1006 may be operable to dynamically adjust BLE packet payload size based on the identified Bluetooth BR/EDR traffic idle intervals for a high throughput.

Figure 11:
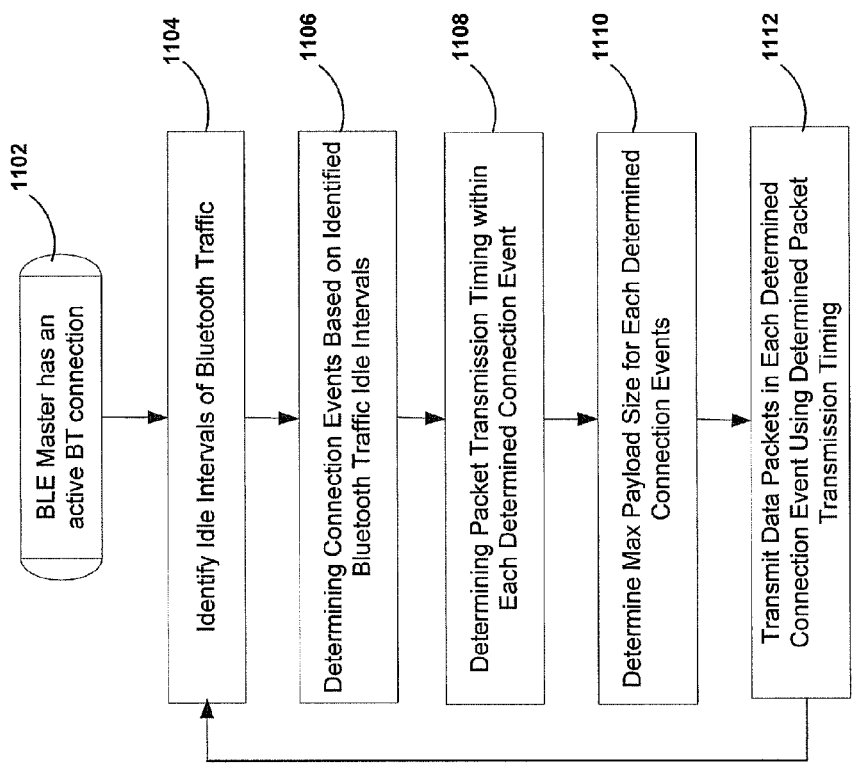
FIG. 11 is a flow chart illustrating exemplary steps for adaptively setting max payload length for BLE link layer connection during Bluetooth BR/EDR traffic communications, in accordance with an embodiment of the invention.

FIG. 11 is a flow chart illustrating exemplary steps for adaptively setting max payload length for BLE link layer connection during the Bluetooth BR/EDR traffic communications, in accordance with an embodiment of the invention. Referring to FIG. 11, the exemplary steps start with step 1102, where the master device 1000 may be associated with an active Bluetooth connection. The master device 10100 may be operable to schedule BLE traffic in associated BLE link layer connections without interrupting concurrent Bluetooth BR/EDR traffic communications. The BLE traffic may be scheduled in a way to avoid transmission interference from the Bluetooth BR/EDR traffic. In step 1104, the master device 1000 may be operable to identify idle intervals within the Bluetooth BR/EDR traffic communications. The identified Bluetooth BR/EDR traffic idle intervals comprise idle intervals in between Bluetooth packets, Bluetooth slots, and Bluetooth frames. In step 1106, the master device 1000 may be enabled to determine connection events (connection timing and connection interval) in associated BLE link layer connections based on the identified Bluetooth BR/EDR traffic idle intervals. The master device 1000 may be operable to schedule connection events within the determined Bluetooth BR/EDR traffic idle intervals. Both connection event timing and connection interval for each connection event may be selected within the identified Bluetooth BR/EDR traffic idle intervals. In step 1108, the master device 1000 may be enabled to determine packet transmission timing within each determined connection event based on the identified Bluetooth BR/EDR traffic idle intervals. In step 1110, the master device 1000 may be enabled to determine maximum payload size for the determine packet transmission timing within each determined connection event based on the identified Bluetooth BR/EDR traffic idle intervals. In step 1112, the master device 1000 may be enabled to transmit data packets within each determined connection event using determined packet transmission timing. The exemplary steps may return to step 1104 for continuing supporting the BLE traffic and the Bluetooth BR/EDR traffic communications simultaneously.

Figure 12:
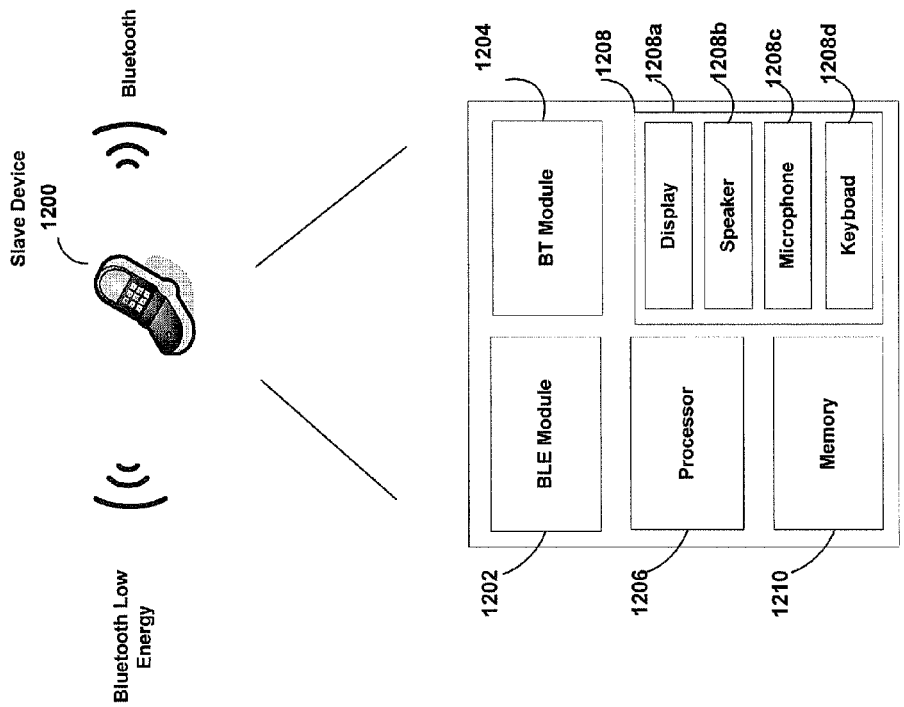
FIG. 12 is a diagram illustrating an exemplary dual-mode BLE slave that is operable to support BLE activities and Bluetooth BR/EDR traffic communications simultaneously, in accordance with an embodiment of the invention.

FIG. 12 is a diagram illustrating an exemplary dual-mode BLE slave that is operable to support BLE activities and Bluetooth BR/EDR traffic communications simultaneously, in accordance with an embodiment of the invention. Referring to FIG. 12, there is shown a BLE-Bluetooth dual-mode slave device 1200. The slave device 1200 comprises a BLE module 1202, a BT module 1204, a processor 1206 and a memory 1208.

The BLE module 1202 may comprise suitable logic, circuitry, interfaces and/or code that may be enabled to transmit and/or receive signals over Bluetooth low energy air interface and communicate with the processor 1206 for further processing.

The BT module 1204 may comprise suitable logic, circuitry, interfaces and/or code that may be enabled to transmit and/or receive signals over, for example, Bluetooth air interfaces. The BT module 1204 may be enabled to communicate the signals with the processor 1206 for further processing.

The processor 1206 may comprise suitable logic, circuitry, interfaces and/or code that may be enabled to perform a variety of signal processing tasks and may comprise controlling of the BLE module 1202 as well as the BT module 1204. The processor 1206 may be enabled to synchronize to a packet transmission timing determined by the master device 1000 for data packet transmission. The processor 1206 may be enabled to transmit in the data channel upon receiving a packet from the master device 1000. The processor 1206 may be enabled to support BLE traffic and Bluetooth BR/EDR traffic communications simultaneously. In this regard, the processor 1206 may be enabled to monitor Bluetooth BR/EDR traffic communications over the BT module 1204 to determine Bluetooth BR/EDR traffic idle intervals.

The processor 1206 may be operable to adjust associated BLE connection parameters such as, for example, connection event interval, connection event anchor points and slave latency based on the Bluetooth BR/EDR traffic idle intervals. The processor 1206 may be operable to determine new BLE connection parameters in order to continue BLE traffic within the determined Bluetooth idle intervals to avoid in-band transmission interferences from concurrent Bluetooth BR/EDR traffic communications. The processor 1206 may be enabled to transmit a connection update request (CONNETION_UPDATE_REQ) packet in associated link layer connection to communicate the determined new connection parameters with the master device 1000. The processor 1206 may be enabled to synchronize to new connection anchor points after receiving a data packet in a connection event with the determined new connection parameters. The processor 1206 may be enabled to continue BLE traffic within the determined Bluetooth idle intervals in associated link layer connection with updated connection parameters.

The memory 1208 may comprise suitable logic, circuitry, interfaces and/or code that may be operable to store data and/or other information utilized by the processor 1206. For example, the memory 1208 may be utilized to store BLE data packets and/or Bluetooth data packets. The memory 1208 may be operable to store various algorithms for determining BLE connection parameters for BLE traffic based on Bluetooth BR/EDR traffic idle intervals. The memory 1208 may be operable to store executable instructions for transmitting CONECTION_UPDATE_REQ packets to the master device 1000 for associated link layer connection. The memory 1208 may comprise RAM, ROM, low latency nonvolatile memory such as flash memory and/or other suitable electronic data storage capable of storing data and instructions.

In operation, the slave device 1200 may be operable to support BLE traffic and Bluetooth BR/EDR traffic communications simultaneously. The processor 1206 may be enabled to determine Bluetooth BR/EDR traffic idle intervals over the BT module 1204. The processor 1206 may be enabled to determine new BLE connection parameters in order to allocate BLE traffic within the determined Bluetooth idle intervals to avoid in-band transmission interferences from concurrent Bluetooth BR/EDR traffic communications for a high throughput. The processor 1206 may be enabled to utilize various algorithms stored in the memory 1208 to calculate connection event interval, connection event anchor points, and slave latency based on the Bluetooth BR/EDR traffic idle intervals. The processor 1206 may be enabled to transmit a CONNETION_UPDATE_REQ packet via the BLE module 1202 in associated link layer connection to communicate the determined new connection parameters with the master device 1000. The processor 1206 may be enabled to synchronize to new connection anchor points for BLE traffic within the determined Bluetooth BR/EDR traffic idle intervals after receiving an acknowledgement from the master device 1000 for the CONNETION_UPDATE_REQ packet. The processor 1206 may be enabled to continue communication of BLE traffic within the determined Bluetooth idle intervals in associated link layer connection with updated connection parameters.

Figure 13:
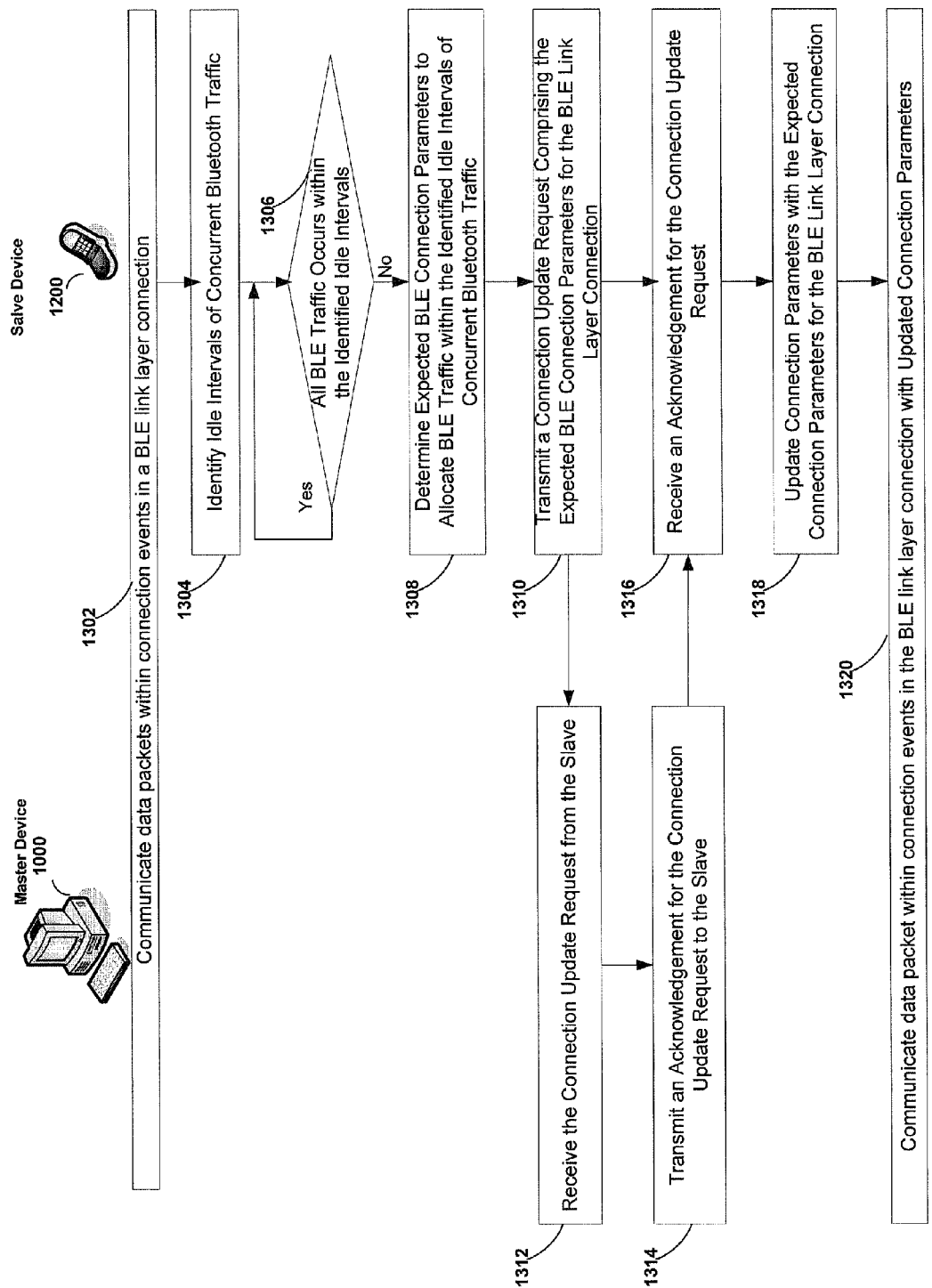
FIG. 13 is a flow chart illustrating exemplary steps for initiating a link layer connection update via an intended slave, in accordance with an embodiment of the invention

FIG. 13 is a flow chart illustrating exemplary steps for initiating a link layer connection update via an intended slave, in accordance with an embodiment of the invention. Referring to FIG. 13, the exemplary steps start with step 1302, where the slave device 1200 and the master device 1000 may communicate data packets within connection events in a BLE link connection. In step 1304, the slave device 1200 may be enabled to identify idle intervals within the Bluetooth BR/EDR traffic communications over the BT module 1204. The identified Bluetooth BR/EDR traffic idle intervals may comprise idle intervals in between Bluetooth packets, Bluetooth slots, and/or Bluetooth frames. In step 1306, the slave device 1300 may determine whether BLE traffic in the BLE link layer connection may occur within the identified idle intervals of the Bluetooth BR/EDR traffic communication. In instances where at least a portion of the BLE traffic in the BLE link layer connection occurs outside the identified idle intervals of the Bluetooth BR/EDR traffic communication, then in step 1308, the slave device 1200 may be enabled to determine expected BLE connection parameters in order to allocate BLE traffic within the identified idle intervals of the Bluetooth BR/EDR traffic communication. In step 1310, the slave device 1200 may be operable to transmit a connection update request packet comprising the expected connection parameters to the master device 1000 in the link layer connection. In step 1312, the master device 1000 may be enabled to receive the connection update request packet from the slave device 1200 in the link layer connection. In step 1314, the master device 1000 may be enabled to transmit an acknowledgement for the connection update request to the slave device 1200. The master device 1000 may be enabled to update connection parameters with the expected connection parameters for the BLE link layer connection with the slave device 1200. The master device 1000 may be enabled to utilize the updated connection parameters for packet transmissions within subsequent connection events in the link layer connection with the slave device 1200. In step 1316, the slave device 1200 may be enabled to receive the acknowledgement from the master device 1000 for the connection update request. In step 1318, the slave device 1200 may be enabled to update connection parameters with the expected connection parameters for the BLE link layer connection with the master device 1000. The slave device 1200 may be enabled to utilize the updated connection parameters for packet transmissions within subsequent connection events in the link layer connection with the master device 1000. In step 1320, the slave device 1200 and the master device 1000 may be enabled to continue data packet communication in the link layer connection with the updated connection parameters.

Aspects of a method and system for a dual-mode Bluetooth low energy device are provided. In accordance with various exemplary embodiments of the invention, a dual-mode BLE device such as, for example, the advertiser 120, the scanner 130, the initiator 140, the master device 150, and/or the slave device 170 in the BLE communication system 100, may be operable to identify idle intervals within the Bluetooth BR/EDR traffic communications. The dual-mode BLE device may be enabled to concurrently perform various BLE activities such as advertising within the identified idle intervals within the Bluetooth BR/EDR traffic communications. The advertiser 120 may be configured to schedule advertising packet transmissions within the determined idle intervals of the Bluetooth BR/EDR traffic communications over the BT module 304 to avoid in-band transmission interferences. The advertiser 120 may be enabled to determine advertising intervals in the identified idle intervals of the Bluetooth BR/EDR traffic communications. The advertiser 120 may be operable to concurrently perform advertising of packet transmissions for service advertisements and/or connection setup within the determined advertising intervals. As described with respect to FIG. 4, the advertiser 120 may be enabled to determine packet transmission timing and packet size for the advertising packet transmissions based on the identified idle intervals of the Bluetooth BR/EDR traffic communications over the BT module 304.

As described with respect to, for example, FIG. 1, FIG. 5 and FIG. 6, a dual-mode BLE device such as the scanner 130 may be enabled to concurrently perform a scanning procedure within corresponding identified idle intervals of the Bluetooth BR/EDR traffic communications over the BT module 504. The scanner 130 may be enabled to determine a scan window for the scanning procedure based on the identified idle intervals of the Bluetooth BR/EDR traffic communications. The scanner 130 may be configured to scan advertising packet transmissions using the determined scan window within the identified idle intervals of the Bluetooth BR/EDR traffic communications. As described with respect to FIG. 7, the scanner 130 may be operable to adjust the determined scan window in various ways to achieve low power consumption. For example, the scanner 130 may be enabled to estimate timing of expected advertising packet transmissions. The determined scan window may be adjusted based on the timing of expected advertising packet transmissions. The adjusted scan window may be turned ON specifically for the expected advertising packet transmissions. Alternatively, the scanner 130 may be enabled to reduce the size of the determined scan window by tracking cadence or periodicity of advertising packet transmissions. The scanner 130 may be enabled to estimate an advertising interval from the cadence or periodicity of corresponding advertising packet transmissions. The scanner 130 may be operable to reduce the size of the determined scan window based on the estimated advertising interval. The scanner 130 may be enabled to continue scanning of advertising packet transmissions using the adjusted scan window.

As described with respect to, for example, FIG. 1, FIG. 5 and FIG. 6, a dual-mode BLE device such as the scanner 130 may have a dual-correlation capability such that the BLE advertising packets and other packets such as the BR/EDR packets may be detected in a single advertising channel. In this regard, the scanner 130 may be operable to scan packets transmitted over the single advertising channel. The BLE advertising packets and/or the BR/EDR packets may be detected by correlating the scanned packets with, for example, known sequence rates. The scanner 130 may be enabled to concurrently perform a scanning procedure within corresponding identified idle intervals of the Bluetooth BR/EDR traffic communications over the BT module 504.

As described with respect to, for example, FIG. 1 and FIG. 9, a dual-mode BLE receiver such as the scanner 130 and/or the initiator 130 may be enabled to receive advertising packets in advertising channels. The scanner 130 and/or the initiator 140 may be operable to use a white list for device filtering. The white list comprises device class bits of preferred BLE devices. The scanner 130 and/or the initiator 140 may be enabled to extract device class bits from the received advertising packets for device filtering. The scanner 130 and/or the initiator 140 may be enabled to compare the extracted device class bits with the white list. Advertising packets received from advertisers in the white list may be processed by corresponding host.

As described with respect to, for example, FIG. 1, FIG. 10, and FIG. 11, a dual-mode BLE device such as the master device 150 may be enabled to set maximal payload size for BLE data packets in associated BLE link layer connections based on the identified idle intervals of the Bluetooth BR/EDR traffic communications over the BT module 1104. The master device 150 may be operable to concurrently communicate BLE data packets within the identified idle intervals of the Bluetooth BR/EDR traffic communications.

Referring to FIG. 1, FIG. 12, and FIG. 13, the slave device 170 may be associated with an existing BLE link layer connection with the master device 150. The slave device 170 may be configured to determine connection parameters based on the identified idle intervals of the Bluetooth BR/EDR traffic communications over the BT module 1304 for the existing BLE link layer connection. The slave device 170 may be enabled to send a connection request packet with the determined connection parameters to the master device 150 for updating connection parameters of the existing BLE link layer connection. Once acknowledged by the master device 150, the slave device 170 may be operable to continue communication of BLE data packets in the existing BLE link layer connection using the updated connection parameters.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for a method and system for a dual-mode Bluetooth low energy device.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method of processing signals, the method comprising:
   performing by one or more processors, one or more circuits, or any combination thereof in a dual-mode Bluetooth low energy (BLE) device:
   identifying an idle interval within Bluetooth Basic Rate (BR)/Enhanced Data Rate (EDR) traffic communications by determining a duration of said idle interval before said idle interval ends;
   performing BLE activities within said identified idle interval of said Bluetooth BR/EDR traffic communications;
   determining an advertising interval within said identified idle interval of said Bluetooth BR/EDR traffic communications;
   determining packet transmission timing and packet size for advertising packet transmissions based at least in part on said identified idle interval of said Bluetooth BR/EDR traffic communications; and
   performing advertising packet transmissions within said determined advertising interval.

2. The method according to claim 1, comprising:
   determining a scan window based at least in part on said identified idle interval of said Bluetooth BR/EDR traffic communications; and
   scanning, within another identified idle interval of said Bluetooth BR/EDR traffic communications, other advertising packet transmissions using said determined scan window.

3. The method according to claim 2, comprising:
   estimating a corresponding advertising interval of said other advertising packet transmissions;
   adjusting said determined scan window based at least in part on said corresponding advertising interval of said other advertising packet transmissions; and
   scanning said other advertising packet transmissions using said adjusted scan window.

4. The method according to claim 1, comprising:
   receiving packets in an advertising channel; and detecting said BLE activities, said BR/EDR traffic communications, or both based at least in part on said received packets.

5. The method according to claim 1, comprising:
receiving an advertising packet;
extracting device class bits from said received advertising packet; and
performing device filtering based at least in part on said extracted device class bits.

6. The method according to claim 1, comprising:
setting a maximal payload size for BLE data packets based at least in part on said identified idle interval of said Bluetooth BR/EDR traffic communications; and
communicating said BLE data packets, as a master, within said identified idle interval of said Bluetooth BR/EDR traffic communications.

7. The method according to claim 1, comprising:
determining connection parameters based at least in part on said identified idle interval of said Bluetooth BR/EDR traffic communications for an existing BLE link layer connection, in which said dual-mode BLE device operates as a slave;
updating connection parameters of said existing BLE link layer connection with said determined connection parameters; and
continuing communication in said existing BLE link layer connection using said updated connection parameters.

8. A method of processing signals, the method comprising:
performing by one or more processors, one or more circuits, or any combination thereof in a dual-mode Bluetooth low energy (BLE) device:
identifying an idle interval within Bluetooth Basic Rate (BR)/Enhanced Data Rate (EDR) traffic communications by determining a duration of said idle interval before said idle interval ends;
performing BLE activities within said identified idle interval of said Bluetooth BR/EDR traffic communications;
determining a scan window based at least in part on said identified idle interval of said Bluetooth BR/EDR traffic communications;
scanning, within said identified idle interval of said Bluetooth BR/EDR traffic communications, advertising packet transmissions using said determined scan window;
estimating timing for expected advertising packet transmissions;
adjusting said determined scan window based at least in part on said estimated timing; and
scanning said expected advertising packet transmissions using said adjusted scan window.

9. The method according to claim 8, comprising:
receiving an advertising packet;
extracting device class bits from said received advertising packet; and
performing device filtering based at least in part on said extracted device class bits.

10. The method according to claim 8, comprising:
setting a maximal payload size for BLE data packets based at least in part on said identified idle interval of said Bluetooth BR/EDR traffic communications; and
communicating said BLE data packets, as a master, within said identified idle interval of said Bluetooth BR/EDR traffic communications.

11. The method according to claim 8, comprising:
determining connection parameters based at least in part on said identified idle interval of said Bluetooth BR/EDR traffic communications for an existing BLE link layer connection, in which said dual-mode BLE device operates as a slave;
updating connection parameters of said existing BLE link layer connection with said determined connection parameters; and
continuing communication in said existing BLE link layer connection using said updated connection parameters.

12. A system for processing signals, the system comprising:
one or more processors, one or more circuits, or any combination thereof in a dual-mode Bluetooth low energy (BLE) device, wherein said one or more processors, said one or more circuits, or any combination thereof are operable to:
identify an idle interval within Bluetooth Basic Rate (BR)/Enhanced Data Rate (EDR) traffic communications by determining a duration of said idle interval before said idle interval ends;
perform BLE activities within said identified idle interval of said Bluetooth BR/EDR traffic communications;
determine an advertising window within said identified idle interval of said Bluetooth BR/EDR traffic communications;
determine packet transmission timing and packet size for advertising packet transmissions based at least in part on said identified idle interval of said Bluetooth BR/EDR traffic communications; and
perform advertising packet transmissions within said determined advertising interval.

13. The system according to claim 12, wherein said one or more processors, said one or more circuits, or any combination thereof are operable to:
determine a scan window based at least in part on said identified idle interval of said Bluetooth BR/EDR traffic communications; and
scan, within another identified idle interval of said Bluetooth BR/EDR traffic communications, other advertising packet transmissions using said determined scan window.

14. The system according to claim 13, wherein said one or more processors, said one or more circuits, or any combination thereof are operable to:
estimate timing for expected advertising packet transmissions;
adjust said determined scan window based at least in part on said estimated timing; and
scan said expected advertising packet transmissions using said adjusted scan window.

15. The system according to claim 12, wherein said one or more processors, said one or more circuits, or any combination thereof are operable to:
receive packets in an advertising channel; and
detect said BLE activities, said BR/EDR traffic communications, or both based at least in part on said received packets.

16. The system according to claim 12, wherein said one or more processors, said one or more circuits, or any combination thereof are operable to:
receive an advertising packet;
extract device class bits from said received advertising packet; and
perform device filtering based at least in part on said extracted device class bits.

17. The system according to claim 12, wherein said one or more processors, said one or more circuits, or any combination thereof are operable to:
set a maximal payload size for BLE data packets based at least in part on said Bluetooth BR/EDR traffic communications; and
communicate said BLE data packets, as a master, within said identified idle interval of said Bluetooth BR/EDR traffic communications.

18. The system according to claim 12, wherein said one or more processors, said one or more circuits, or any combination thereof are operable to:
determine connection parameters based at least in part on said identified idle interval of Bluetooth BR/EDR traffic communications for an existing BLE link layer connection, in which said dual mode BLE device operates as a slave;
update connection parameters of said existing BLE link layer connection with said determined connection parameters; and
continue communication in said existing BLE link layer connection using said updated connection parameters.

19. A system for processing signals, the system comprising:
one or more processors, one or more circuits, or any combination thereof in a dual-mode Bluetooth low energy (BLE) device, wherein said one or more processors, said one or more circuits, or any combination thereof are operable to:
identify an idle interval within Bluetooth Basic Rate (BR)/Enhanced Data Rate (EDR) traffic communications by determining a duration of said idle interval before said idle interval ends;
perform BLE activities within said identified idle interval of said Bluetooth BR/EDR traffic communications;
determine a scan window based at least in part on said identified idle interval of said Bluetooth BR/EDR traffic communications;
scan, within said identified idle interval of said Bluetooth BR/EDR traffic communications, advertising packet transmissions using said determined scan window;
estimate a corresponding advertising interval of said advertising packet transmissions;
adjust said determined scan window based at least in part on said corresponding advertising interval of said advertising packet transmissions; and
scan said advertising packet transmissions using said adjusted scan window.

20. The system according to claim 19, wherein said one or more processors, said one or more circuits, or any combination thereof are operable to:
set a maximal payload size for BLE data packets based at least in part on said Bluetooth BR/EDR traffic communications; and
communicate said BLE data packets, as a master, within said identified idle interval of said Bluetooth BR/EDR traffic communications.

21. The system according to claim 19, wherein said one or more processors, said one or more circuits, or any combination thereof are operable to:
determine connection parameters based at least in part on said identified idle interval of Bluetooth BR/EDR traffic communications for an existing BLE link layer connection, in which said dual mode BLE device operates as a slave;
update connection parameters of said existing BLE link layer connection with said determined connection parameters; and
continue communication in said existing BLE link layer connection using said updated connection parameters.

* * * * *